United States Patent Office 3,027,801
Patented Apr. 3, 1962

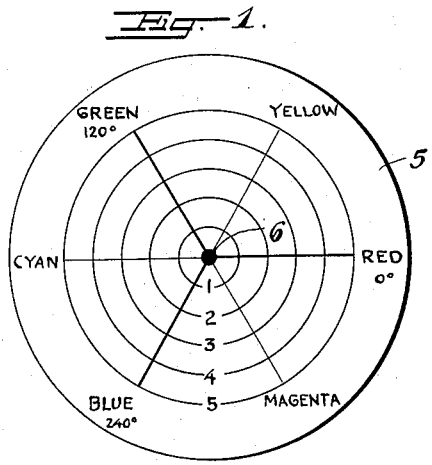
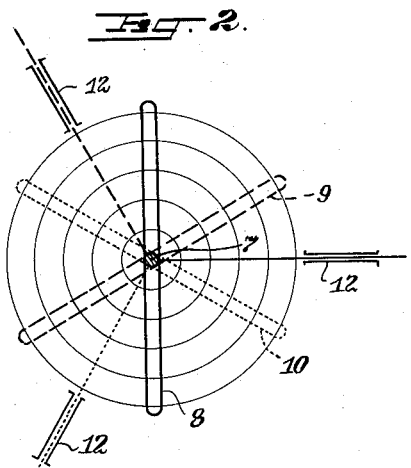
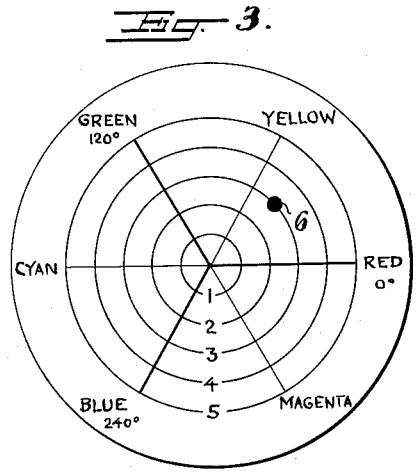
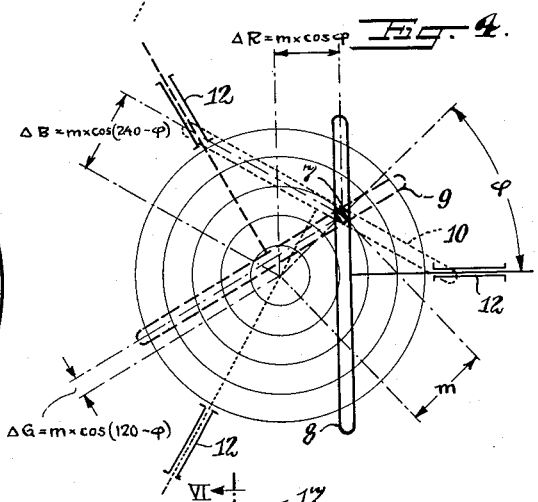
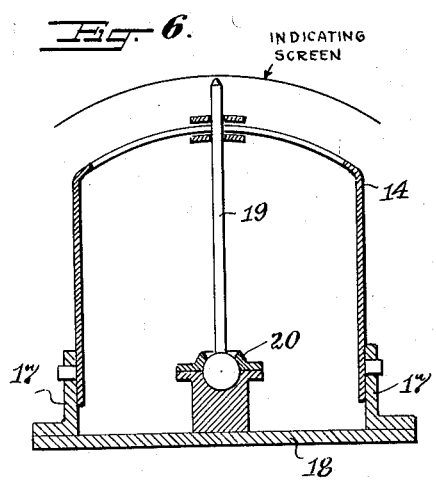
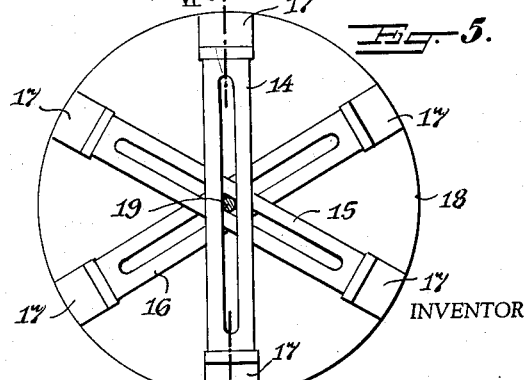

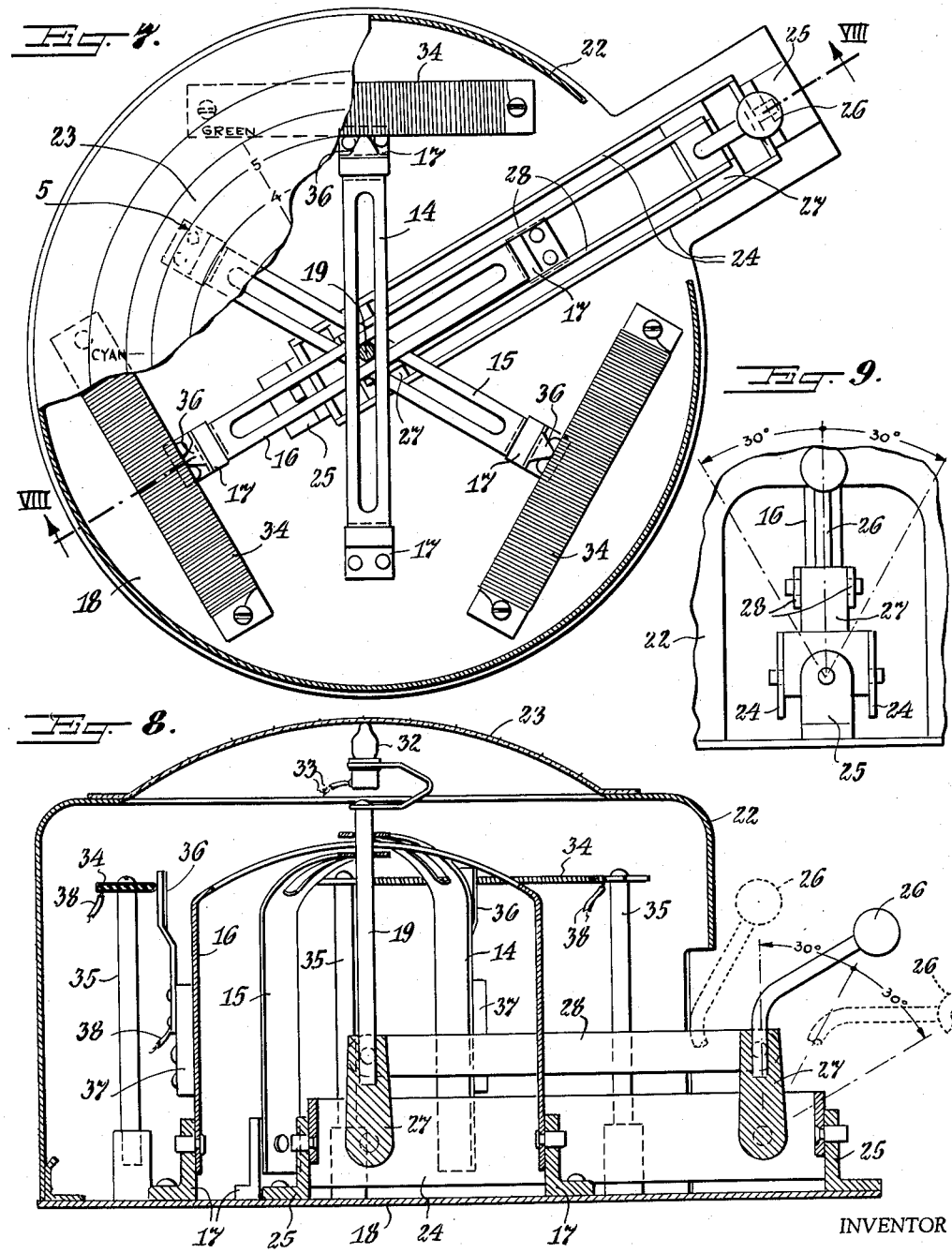

3,027,801
EXPOSURE CONTROL DEVICE FOR PHOTO-GRAPHIC COLOR PRINT APPARATUS
Alfred Simmon, Garden City, N.Y., assignor, by mesne assignments, to Simmon Brothers, Inc., New York, N.Y., a corporation of New York
Filed Jan. 18, 1960, Ser. No. 3,032
7 Claims. (Cl. 88—24)

The present invention relates to a computing device and more particularly to an analogue computer primarily intended for use in photographic color printing.

It has long been recognized in the photographic color printing and especially in the making of enlargements from a colored negative that certain defects in color can be corrected by proper adjustment without affecting the overall density of the finished enlarged print. In other words during an exposure of sensitized paper to a light beam passing through a colored negative, the density of the finished print is the reuslt of the product of time and light intensity and with the printing of colors, correction can be made by changing the ratio of various predominant colors relative to each other while keeping their sum constant. Consequently, it is actually immaterial whether the ratios of the exposure times of differently colored light are changed while the sum of all the colors is kept constant, or whether the ratios of the intensities of the differently colored light beams are changed, while again maintaining their sum constant. Although the present invention will be described as predominantly used for the attenuation of light intensities rather than exposure times, it is to be clearly understood that since the two are equivalent and interchangeable for the reasons above-noted, such description of the present invention is not to be construed as so limiting such invention.

For all intent and purposes of the present invention, light can be considered as possessing two significant properties, namely, color and intensity which thus makes it somewhat analogous to a vector since the latter likewise has two similar factors of direction and magnitude (or length). The direction of the vector, as expressed by the angle between the vector and an arbitrarily chosen reference, will then denote the color and its length the intensity of a light beam. Accordingly, in a three color system wherein the primary colors of red, green and blue are used one can assign the angles of $\varphi=0°$ for the red color, $\varphi=120°$ for green, and $\varphi=240°$ for blue, respectively, so that when all the vectors are equal a neutral grey is generated, i.e.

$$R_0=G_0=B_0$$

in the same manner as illustrated and described in Patent No. 2,921,498, granted January 19, 1960, entitled Electrical Control Device for use with Photographic Color Enlargers and Printers, of which I am one of the joint patentees and which patent is assigned to the same assignee as the present invention.

A color correction, or deviation from the neutral grey, thus will consist of three components, namely, $\Delta R$, $\Delta G$ and $\Delta B$, and the intensities of the above-noted three primary colors, after the introduction of a color correction, would be:

$$R=R_0+\Delta R$$
$$G=G_0+\Delta G$$
$$B=B_0+\Delta B$$

so that the colors red, green and blue following such correction no longer add up to a neutral grey. Also, in order for an operator to adjust color and density of a photographic print separately and independently from each other, it follows that, as hereinbefore noted, the sum of the three basic color components must not be changed, while their ratios relative to each other is adjusted, or:

$$R+G+B=R_0+G_0+B_0=\text{Constant}$$

which obviously means that $$\Delta B+\Delta G+\Delta B=0$$

i.e., the sum of the components of a color correction must always be zero. This condition is accordingly met by making:

$$\Delta R=m \cos \varphi$$
$$\Delta G=m \cos (120-\varphi)$$
$$\Delta B=m \cos (240-\varphi)$$

where $\varphi$ denotes the color correction and the factor $m$ its magnitude. The condition $$\Delta R+\Delta G+\Delta B=0$$

is met because $$\cos \varphi+\cos (120-\varphi)+\cos (240-\varphi)=0$$

Although the same relationship may be expressed in several different ways by using different trigonometric functions and of course holds for more than just three primary colors, the foregoing relationship is simple and readily applicable to the computing device of the present invention wherein only three primary colors have been chosen.

It is accordingly the primary object of the present invention to provide a computing device which is readily preselectable by an operator to adjust color for the making of a photographic color print by adjusting the ratios of the intensities of the primary colors while maintaining the sum thereof constant.

Another object of the present invention is the provision of an analogue computer for use in the making of photographic color prints and enlargements, wherein the ratio of the intensities of the primary colors is readily adjustable by an operator while the sum of their intensities is maintained constant, and which computer is accurate in its operation and economical to manufacture.

Still further objects of the present invention will become obvious to those skilled in the art by reference to the accompanying drawings wherein:

FIGURE 1 is an indicator chart which may form part of the present invention and wherein various radial lines denote several of the primary colors and a plurality of concentric circles indicate the magnitude of all color corrections, FIG. 2 is a schematic showing of one form which the analogue computer of the present invention may take, FIG. 3 is a view identical to that of FIG. 1 but showing the analogue computer of the present invention set for a color correction as shown on the indicator, FIG. 4 is a schematic view of the form of the device shown in FIG. 2 in the position to which it has been adjusted by the operator in accordance with the indicator setting shown in FIG. 3, FIG. 5 is a plan view of a more simplified form which the analogue computer of the present invention may take, FIG. 6 is a cross-sectional view taken on the line VI—VI of FIG. 5, FIG. 7 is a plan view of a more desirable commercial form of the analogue computer of the present invention with part thereof broken away to better illustrate the internal mechanism thereof.

FIG. 8 is a cross-sectional view taken on the line VIII—VIII of FIG. 7, and

FIG. 9 is a fragmentary view of the right side of the device as shown in FIG. 8 and illustrating the control lever in the neutral grey position.

Referring now to the drawings in detail for a better understanding of the present invention there is shown in FIG. 1 an indicating chart 5 which forms part of the present device as hereinafter described more in detail. It will be noted that from the axis 6 a heavy radial line extends to the legend "Red 0°" near the outer circumference and similarly heavy radial lines extend to the legends "Green 120°" and "Blue 240°." Likewise lighter radial lines bisect the angles formed by the heavy lines and extend to the circumferential legends "yellow," "Cyan" and "Magenta," respectively, while a plurality of numbered concentric circles depict the magnitude of color correction. Passing now to the form of the present invention as shown in FIG. 2 it comprises a master element 7 of cylindrical configuration (shown only in cross-section in FIG. 2) and freely movable by an operator in all directions parallel to itself, or in other words in all direction at right angles to its longitudinal axis.

Three elongated T-shaped members 8, 9, and 10 linearly movable in respective bearings 12, and which may be considered as corresponding to the three primary colors of red, green and blue, are each disposed in slightly spaced parallel planes, so that the master element 7 passes through slots in the top of the T of each member. Thus when the master element 7 is positioned on the axis 6 of the chart 5, which corresponds to its position as also shown in FIG. 2, the analogue computer is in its neutral grey position. Assuming now that an examination of a colored negative shows a color correction for a color lying somewhere between red and yellow to be desirable, the operator then may move the master element 7 to the position shown by the dot in FIG. 3 which is then the new location of the axis 6 of FIG. 1 and corresponds to the new position to which the master element 7 has been adjusted as shown in FIG. 4.

As can be seen from this latter illustration, all the tops of the T-shaped members 8, 9 and 10 now occupy different positions which means that their respective base portions have linearly moved within their respective bearings 12 and changed the setting of rheostats or potentiometers (not shown) with which they are normally connected. Accordingly, the master element 7 will have moved a distance $m$ corresponding to the magnitude of the desired color correction and through an angle $\varphi$ representative of the direction of such color correction. At the same time the member 8 will have moved the distance $$\Delta R = m \cos \varphi$$

the member 9 a distance $\Delta G = m \cos (120° - \varphi)$ and the member 10 a distance $\Delta B = m \cos (240° - \varphi)$, as shown in FIG. 4, thus producing a different magnitude of the setting of the respective rheostats or potentiometers with which such members are connected, but without altering the sum of the resultant electrical value used to actuate the customary color filters, as shown and described in the aforesaid Patent No. 2,921,498, granted January 19, 1960, as well as in copending application, Serial No. 3,033, filed concurrently herewith and of which I am one of the joint applicants. Although the device as shown and described relative to FIGS. 2 and 4 is geometrically correct and hence performs the desired functions, it is not too practical because of the necessary bearing lengths, as well as the length of the slots in the top of the T-shaped members, required to minimize friction and prevent binding, all of which tends to make the device of undesirably large area and dimensions.

The drawbacks inherent in the device as shown in FIGS. 2 and 4 are substantially eliminated in the form of the analogue computer as shown in the remaining figures. For example, in the latter embodiment of the present invention all linear movement has been replaced by rotary or swivel movement of the various elements which thus reduces space requirements and mechanical friction by use of smaller bearings. As seen in FIG. 5, the adjustable elements comprise substantially hemispherical segments or inverted U-shaped members 14, 15 and 16 pivotally connected at their free depending ends to brackets 17 carried by a suitable base members 18 and movable through different closely spaced arcs, as shown in FIG. 6. Again a master element 19, which is connected to the base member 18 through a universal joint 20, passes through slots provided in the upper arcuate portion of each of the adjustable members 14, 15 and 16, so that movement of the master element 19 in any direction about its universal joint 20 causes rotary movement of each of the adjustable mebers 14, 15 and 16 about their respective pivotal connections and through their respective arcuate paths but again with each adjustable element rotating through an arc of different length and corresponding to the same values of:

$$\Delta R = m \cos \varphi$$
$$\Delta G = m \cos (120° - \varphi)$$
$$\Delta B = m \cos (240° - \varphi)$$

Accordingly, when such movement is appropriately connected to the proper control elements such as rheostats or potentiometers the desired color correction is again obtained, such as in the manner shown and described in the aforesaid copending application, Serial No. 3,033, filed concurrently herewith.

By reference now to FIGS. 7, 8 and 9, a more desirable commercial embodiment of the analogue computer of the present invention is therein shown which more readily adapts it to a complete color printing device such as shown in the above-mentioned concurrently filed copending application. Here again the U-shaped members 14, 15 and 16 are pivoted to brackets 17 which are in turn affixed to the base member 18 with such members 14, 15 and 16 being in this instance encased within a housing 22 secured to the base member 18. This housing 22 is provided with a dome-shaped top 23 formed of translucent plastic preferably of the acrylic type and bears on its outer surface the indicia chart 5 shown in FIG. 1. The housing 22 as shown is provided with a peripheral opening through which the above-mentioned actuating member extends for the purpose of moving the master elment 19 and the various U-shaped members 14, 15 and 16 into preselected color-corrected positions.

Although such actuating member may assume any radial position relative to the movable members 14, 15 and 16 it has been found more desirable from the manufacturing and operating standpoint to have it align with one of the members 16 as shown in FIG. 7. Such actuating member comprises a rectangular frame 24 having its short ends pivotally connected to brackets 25, similar to the brackets 17, and secured to the base member 18 so that such frame 24 can be rotated about a horizontal axis extending through its pivotal connection with the brackets 25, as hereinafter mentioned more in detail. Pivotally connected to this frame 24 is the master element 19 and a readily accessible operating handle 26, with the pivotal supports 27 therefor being interconnected by a pair of connecting bars 28, each in turn pivotally connected to the pivotal supports 27.

It should be apparent from the foregoing that the frame 24 together with the connecting bars 28 form a parallelogram so that any movement of the handle 26 from its full line or neutral grey position up or down through an angle of 30° in either direction, as shown in FIG. 8, causes an identical angular movement of the master element 19 about the connection of its pivotal support 27 with the frame 24. Similarly, movement of the handle 26 to the right or left through an angle of 30° in either direction from its upright or neutral grey position, as seen in FIG. 9, causes rotary movement of the frame 24 about its pivotal connection with the brackets 25 and since the pivotal supports 27 are affixed to such frame, movement of the master element 19 again follows side to side movement of the handle 26, so that a substantially universal movement of the handle 26 in any direction through an angle of 30° from the perpendicular or neutral grey will cause an identical movement of the master element 19.

Inasmuch as the master element 19 again passes through the slots provided in the top of the inverted U-shaped members 14, 15 and 16, as previously described relative to FIGS. 5 and 6, it follows that movement of the master element 19 to any preselected color-corrected position likewise causes swinging movement of the members 14, 15 and 16 about their respective pivotal connections with the brackets 17 but again through arcs of varying lengths to thus produce the several values as hereinbefore mentioned. For the purpose of enabling an operator to preselect the indicated desired color correction, the master element is shown in FIG. 8 as provided with a spring type support 30 carrying a small electric lamp 32, which preferably is of the lens-envelope type commonly used in flashlights, and connected by conductors 33 to a suitable source of electrical energy, such as batteries, or the like, not shown, so that the lamp end is resiliently pressed against the underside of the dome-shaped end 23 and produces a small light spot, thus at all times indicating the precise position of the master element 19 relative to the chart 5 as the lamp 32 slides over the under-surface of the plastic dome 23 and enabling the operator to make a very accurate preselected color-correction adjustment.

Also in this commercial embodiment of the present analogue computer, the housing 22 encloses three control devices here shown as potentiometers 34 with one each operatively associated with one of the swivel members 14, 15 and 16. Each of these potentiometers comprises a resistance element formed of numerous convolutions of resistance wire wound on an elongated "card" made from sheet insulating material and which is supported in a desired position by studs or the like 35 affixed to the base member 18. A spring-type sliding contact 36 of beryllium copper or the like is secured to a block of insulating material 37 attached to one of the upright legs of each of the invenrted U-shaped members 14, 15 and 16, as seen most clearly in FIG. 8, and suitable conductors 38 connect the potentiometers 34 and the sliding contacts 36 to the circuit which forms part of the complete color printing apparatus.

By the arrangement as shown in FIGS. 7, 8 and 9, it should again be apparent that the adjustment of the potentiometers 34 is directly controlled by the angular positions of the swivelling members 14, 15 and 16 and which is in accordance with the respective values of ΔR, ΔG and ΔB to which the analogue computer is adjusted by the operator through movement of the handle 26 to position the light spot at the desired position on the chart 5 carried by the dome-shaped top 23. It should also be noted that in order to give strictly correct values the potentiometers 34 should have an arcuate contour, with their center coinciding with the pivotal connection of the swivelling members with which they are associated, to their respective brackets 17. However, a flat resistance element is far less expensive and the error between the resistance adjustments thereof compared with an arcuate potentiometer is very small especially when the angle through which the elements 14, 15 and 16 swivel is also relatively small as to hardly justify the greatly increased expense of curved potentiometers.

It should thus become obvious to those skilled in the art that an analogue computer particularly adaptable for use in the making of photographic color prints is herein shown and described which is readily adjustable by an operator to preselect any desired color correction indicated as desirable. Such computer once adjusted to its desired preselected correction setting and connected to the customary photographic color printing apparatus is then operable with accuracy and fidelity to assure the making of color prints having desired proper color rendition.

Although several embodiments of the present invention have been shown and described it is to be understood that still further modifications thereof may be made without departing from the spirit and scope of the appended claims:

I claim:
1. An exposure control device for photographic color print apparatus comprising a base member, a master element movably supported by said base member to dispose the free end thereof in any preselected position within a substantially circular plane and corresponding to a desired color correction in both magnitude and direction, control means connected to said master element and manually operable to cause movement of said master element to any position as preselected by an operator, a plurality of movable elements each corresponding to one of the primary colors to be corrected secured to said base member in angularly displaced relation to each other and interconnected by said master element for simultaneous movement thereby in different directions and for different distances upon operation of said control means, electrically-responsive exposure control means disposed adjacent the path of movement of each of said movable elements and adapted to be electrically connected in the circuit for the control of photographic color print apparatus for each of certain primary colors, and connecting means between each of said movable elements and its associated adjacent electrically-responsive exposure control means to cause operation of the latter in accordance with the degree such movable element traverses its path of movement.

2. An exposure control device for photographic color print apparatus as specified in claim 1 wherein said master element comprises an upright member secured to said base member by a substantially universal joint and is connected to said control means by linkage to cause such upright member to follow movement of a handle forming part of said control means as the latter is moved by an operator.

3. An exposure control device for photographic color print apparatus as specified in claim 1 wherein said master element comprises an upright member pivotally connected to a frame which in turn is pivotally connected to said base member on an axis normal to the pivotal connection of the upright member therewith, and wherein the control means comprises a handle pivotally connected to said frame and connected to said upright member by pivoted linkage to produce a parallelogram having a substantially universal connection relation to said base member thus causing the free end of said upright member to precisely follow the movements of the free end of said handle.

4. An exposure control device for photographic color print apparatus as specified in claim 1 wherein said plurality of movable elements each comprises a substantially hemispherical segment pivotally connected at its ends to said base member and having an elongated slot in its arcuate section remote from said base member through which said master element extends to cause simultaneous movement of all said segmental shaped elements about their respective pivots for varying arcuate distances as determined by the movement of said master element to a preselected position in response to actuation of said control means by an operator.

5. An exposure control device for photographic color print apparatus as specified in claim 1 wherein said electrically-responsive exposure control means comprises an electrically responsive element corresponding to the same primary color represented by its adjacent movable element and adapted to be electrically connected in the electrical circuit for control of the photographic color print apparatus, and each said electrically responsive element being operable to influence the color correction as produced by said photographic color print apparatus solely in accordance with the extent such electrically responsive element is operated by the degree of movement of its respective associated movable member.

6. An exposure control device for photographic color print apparatus as specified in claim 1 wherein said connecting means between each said movable element and its adjacent control means comprises a resilient electrically conducting contact insulated from its associated movable element by which it is carried.

7. An exposure control device for photographic color print apparatus as specified in claim 1 wherein said device is provided with a housing having a translucent wall provided with an indicia chart thereon indicative of desired preselected color correction of both magnitude and direction for a plurality of primary colors, and said master element resiliently carries a small electric lamp movable over the under surface of said translucent wall for casting a small light beam in any preselected area of said chart in accordance with the manual operation of said control means.

References Cited in the file of this patent

UNITED STATES PATENTS

| | | |
|---|---|---|
| 2,402,660 | O'Grady | June 25, 1946 |
| 2,470,584 | Simmon | May 17, 1949 |